United States Patent [19]

Matsumura

[11] Patent Number: 4,561,750
[45] Date of Patent: Dec. 31, 1985

[54] IN-FOCUS STATE DETECTION DEVICE
[75] Inventor: Susumu Matsumura, Yokohama, Japan
[73] Assignee: Canon Kabushiki Kaisha, Tokyo, Japan
[21] Appl. No.: 630,410
[22] Filed: Jul. 13, 1984
[30] Foreign Application Priority Data
  Jul. 28, 1983 [JP] Japan .................... 58-138152
[51] Int. Cl.$^4$ .............................................. G03B 3/10
[52] U.S. Cl. .................................................... 354/406
[58] Field of Search ................................ 354/402–409; 250/201 PF, 204
[56] References Cited
U.S. PATENT DOCUMENTS
  4,220,850 9/1980 McEachern .................... 354/406 X
  4,305,657 12/1981 Masunaga et al. ........ 250/201 PF X FOREIGN PATENT DOCUMENTS
  197524 12/1982 Japan .................................... 354/404

Primary Examiner—William B. Perkey
Attorney, Agent, or Firm—Fitzpatrick, Cella, Harper & Scinto

[57] ABSTRACT

In an in-focus state detection device for determining a defocus quantity of an object lens based on a relative positional relationship of a plurality of object images, a contrast of at least one of the object images is detected before the relative positional relationship of the object images is detected, and the relative positional relationship of the object images is detected only when the contrast is larger than a predetermined level so that a determination precision and a response speed of the device are improved.

18 Claims, 7 Drawing Figures

IN-FOCUS STATE DETECTION DEVICE

BACKGROUND OF THE INVENTION

1. Field of the Invention

The present invention relates to an in-focus state detection device used in a camera.

2. Description of the Prior Art

In the prior art, an in-focus state detection device for a camera which determines an in-focus state of an imaging lens by detecting a relative positional relationship between two object images formed by light fluxes transmitted through different pupil areas of the imaging lens has been well known. For example, U.S. Pat. No. 4,185,191 issued Jan. 22, 1980 discloses a device having flyeye lenses arranged in an anticipated focal plane of an imaging lens to form two images whose relative positional relationship varies in accordance with a focusing state of the imaging lens. Japanese patent applications laid-open Nos. 118019/1980 (laid open on Sept. 10, 1980) and 55-155331 (laid open on Dec. 3, 1980) disclose a so-called secondary focusing type device having two focusing lenses arranged behind the anticipated focal plane of the imaging lens. The latter device is long in total length but does not require a special optical system required in the former device.

A principle of the secondary focusing type infocus state detection device is explained with reference to FIG. 1. In a vicinity of a field aperture 2 formed in an anticipated focal plane of an imaging lens 1, a field lens 3 is arranged with an optical axis $O_1$ thereof being aligned with that of the imaging lens 1, and two secondary focusing lenses 4a and 4b are arranged behind the field lens 3, and photo-sensor arrays 5a and 5b are arranged behind the lenses 4a and 4b. Numeral 6 denotes stops arranged in the vicinities of the secondary focusing lenses 4a and 4b.

The field lens 3 essentially focuses an exit pupil of the imaging lens 1 on pupil planes of the secondary focusing lenses. As a result, light fluxes applied to the secondary focusing lenses 4a and 4b are emitted from non-overlapping equi-area regions on the exit pupil plane of the imaging lens corresponding to the secondary focusing lenses 4a and 4b, respectively. When an object image formed in the vicinity of the field lens 3 is refocused on the planes of the sensor arrays 5a and 5b by the secondary focusing lenses 4a and 4b, the positions of the refocused images vary depending on a difference between positions in an optical axis direction of the object image. FIG. 2 illustrates this phenomenon. FIG. 2A shows an in-focus state and FIGS. 2B and 2C show a far-focus state and a near-focus state, respectively, in which the images formed on the sensor arrays 5a and 5b move on the planes of the sensor arrays 5a and 5b in opposite directions. The image light intensity distributions are photo-electically converted by photo-electric conversion elements of the sensor-arrays 5a and 5b and the relative positional relationship of the images is detected by an electrical processing circuit to determine the in-focus state.

The photo-electrically converted signals may be processed by determining the relative positional relationship between the two images (hereinafter referred to as a deviation) by determining a correlation while relatively displacing one of the images to the other by utilizing a fact that the deviation is proportional to a defocus quantity of the imaging lens 1 in order to determine the defocus quantity of the imaging lens 1.

The assignee of the present invention has proposed in U.S. patent application Ser. No. 464,578 filed on Feb. 7, 1983 that the defocus quantity of the imaging lens 1 can be calculated by the following formula:

$$V(m) = \sum_i \min\{a(i), b(i + k - m)\} - \sum_i \min\{a(j + k), b(i - m)\} \quad (1)$$

where $\min\{x-y\}$ represents a smaller one of two real numbers x and y, k is a constant which is normally 1, a range of i is determined by a condition that i, $(i+k-m)$, $(i+k)$ and $(i-m)$ must be in a closed section $[1, N]$, N is the number of photo-electric conversion elements of each of the sensor arrays 5a and 5b, and a(i) and b(i) are outputs of the i-th $(i=1-N)$ photoelectric conversion elements of the sensor arrays 5a and 5b, respectively.

FIG. 3 shows an example of the calculation of the correlation of the two images by the formula (1). In this example, $V(m)=0$ at a point where $m=1.5$. Accordingly, the two images deviate from each other 1.5 times as much as a width of the photo-electric conversion elements of the sensor array 5a or 5b.

In this device when the imaging lens 1 is in a defocus state, the object image is not focused on the planes of the sensor arrays 5a and 5b as shown in FIGS. 2B and 2C so that the contrast of the object images on the photo-sensing planes is lowered in accordance with the defocus state of the imaging lens 1. Accordingly, when the defocus quantity of the imaging lens 1 is very large, the outputs a(i) and b(i) from the sensor arrays 5a and 5b are lowered and an affect of noises to the outputs a(i) and b(i) increases and a rate of change of V(m) to the change of m decreases. As a result, an inaccurate defocus quantity may be detected. For example, $V(m)=0$ may occur for the m which does not provide two matched images. Thus, an exact in-focus state cannot be determined. The same problem arises when the contrast of the object is low.

One method for determining the reliability of the m calculated by the correlation is disclosed in U.S. Pat. No. 4,085,320 issued on Apr. 18, 1978. In this method, the reliability is detenrimed depending on whether a value A representing an amplitude of the correlation graph of FIG. 3 is larger than a predetermined value or not. This method is effective when the number of photo-electric conversion elements of the sensor arrays 5a and 5b is small or an analog processing circuit for the correlation calculation is provided, but it is not always appropriate when the correlation calculation is carried out by a microprocessor after the outputs a(i) and b(i) from the sensor arrays 5a and 5b are A/D converted.

As the number of photo-electric conversion elements of the sensor arrays 5a and 5b increases, a long time is required for the correlation calculation. Thus, if the reliability of the correlation calculation is determined based on the final calculation result, too long a time is required for the determination and a rapid in-focus motion is not attained. When the number of elements is small, the precision of the defocus quantity is low.

SUMMARY OF THE INVENTION

It is an object of the present invention to provide a high performance in-focus state detection device which is free from the problem of reduction of reliability in the correlation calculation.

It is another object of the present invention to provide an in-focus state detection device which can rapidly and precisely determine an in-focus state.

Other objects of the present invention will be apparent from the following description of the embodiments.

DETAILED DESCRIPTION OF THE PREFERRED EMBODIMENTS

Figure 1:
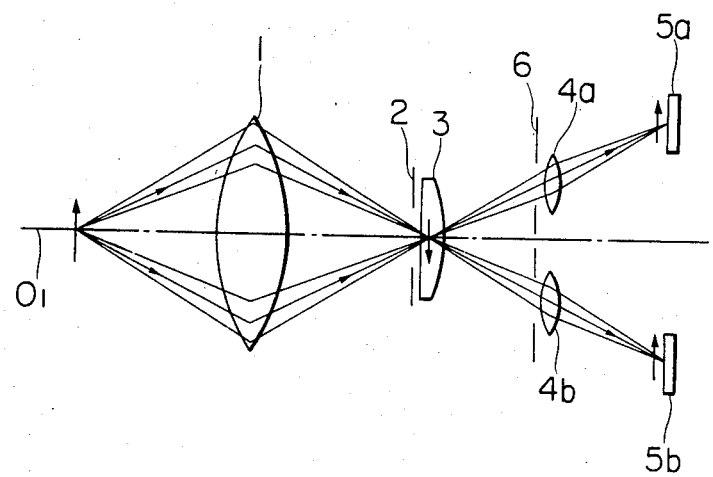
FIG. 1 shows an example of an optical system of an in-focus state detection device.
Figure 3:
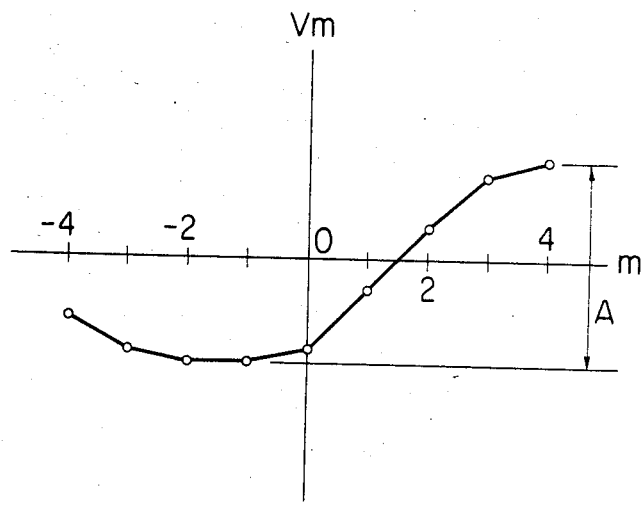
FIG. 3 shows an example of a result of a correlation calculation in a utilization apparatus.
Figure 2A:
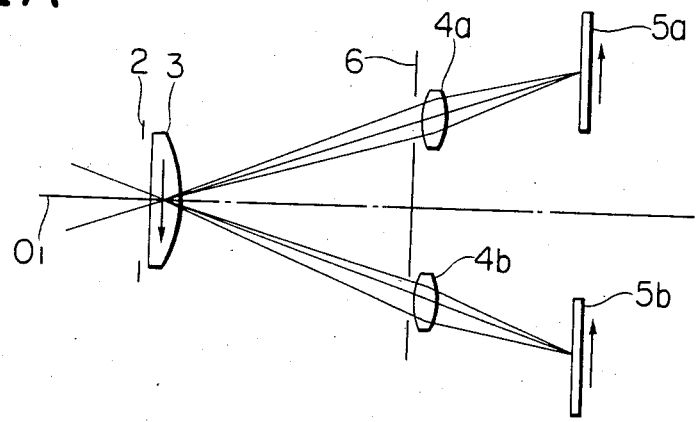
FIGS. 2A, 2B and 2C show in-focus, far-focus and near-focus states of the device of FIG. 1.
Figure 2B:
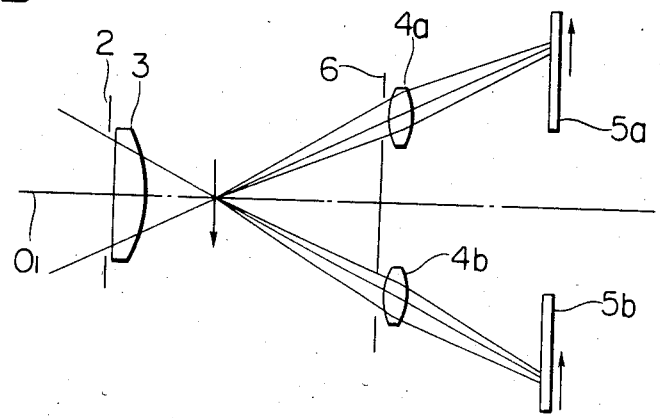
Figure 2C:
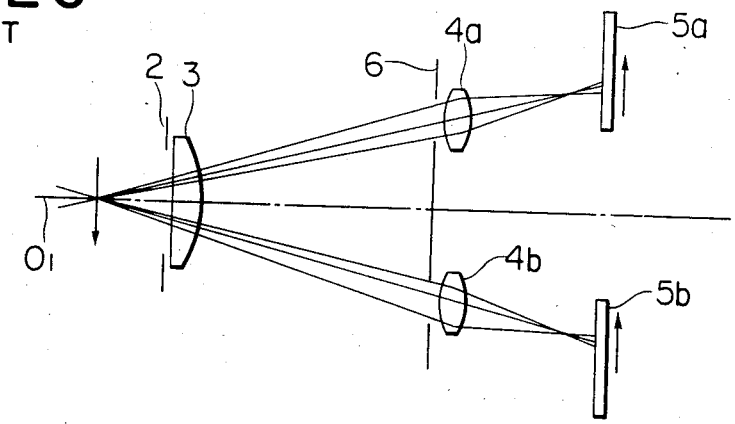
Figure 4:
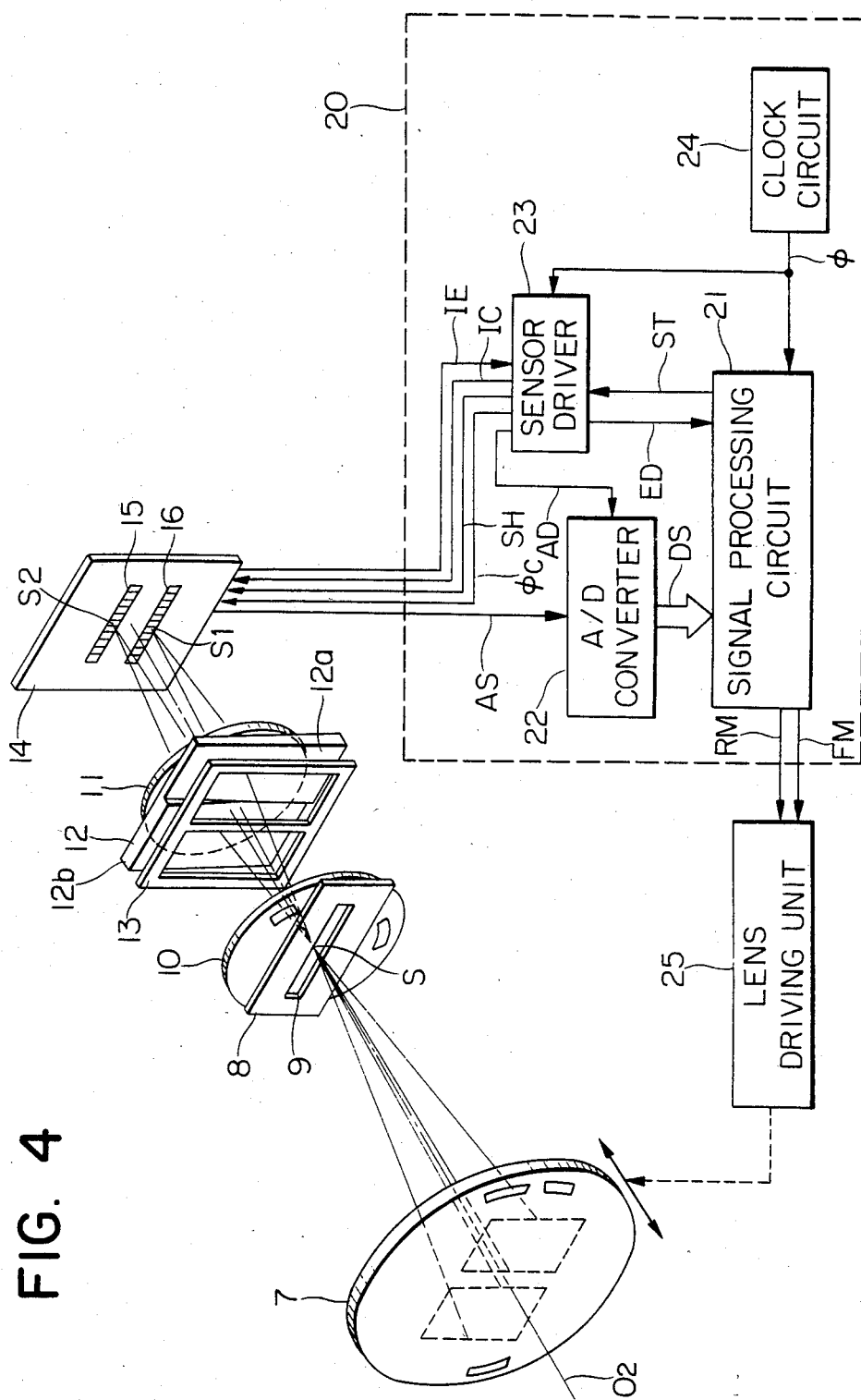
FIG. 4 shows an embodiment of an in-focus state detection device of the present invention.

Referring to FIG. 4, numeral 7 denotes an imaging lens mounted on a camera body, not shown. A light flux from a pupil of the imaging lens 7 passes through a distant measurement field aperture 9 of a shielding plate 8 arranged on an anticipated focusing plane (an image plane of the camera), condensed by a field lens 10 and focused in the vicinity of a wedge prism 12 which functions as pupil dividing means. The wedge prism 12 symmetrically divides the pupil of the imaging lens 7 with respect to an optical axis $O_2$ of the imaging lens 12. Arranged behind the wedge prism 12 is a focusing lens 11 for forming a secondary image, and arranged in front of the prism 12 is an apertured frame 13 for restricting the passage of unnecessary light flux. The field aperture 9 is focused by the focusing lens 11 on a plane of a photo-sensor 14. Thus, an object image S formed by the imaging lens 9 is refocused on the plane of the photo-sensor 14 by the focusing lens 11. The refocused image is divided into two vertically separated object images S1 and S2 by a light flux deflection action of the wedge prism 12. The images S1 and S2 are formed on sensor arrays 15 and 16 which include a number of photo-electric conversion elements such as CCD line sensors. The sensor arrays 15 and 16 produce data signals a(1), a(2), ... a(N-1), a(N) and b(1), b(2), ... b(N-1), b(N), respectively, in accordance with light intensity distributions of the images S1 and S2 to be detected, where N is the number of photo-electric conversion elements of each of the sensor arrays 15 and 16, and a(i) and b(i) are date signal produced by the i-th photo-electric conversion elements counted from the rightmost elements, respectively.

The image S1 is formed by the light flux transmitted through the prism 12a on one side of the wedge prism 12, and the image S2 is formed by the light flux transmitted through the prism 12b having a deflection action in a different direction than that of the prism 12a. Accordingly, the images S1 and S2 are formed by the light fluxes from two different areas of the pupil of the imaging lens 7 and a deviation between the two images S1 and S2 on the plane of the photo-sensor 14 varies in accordance with a focusing state of the imaging lens.

Numeral 20 denotes a discrimination circuit for determining the defocusing quantity of the imaging lens 7 based on the data signals a(i) and b(i) from the sensor arrays 15 and 16. It comprises a signal processing circuit 21, an A/D converter 22 for converting an analog signal AS which is time-serially transferred from the sensor arrays 15 and 16 in the sequence of a(1), a(2), ... a(N-1), a(N), b(1), b(2), ..., b(N-1), b(N), to a digital bit signal DS, a sensor drive circuit 23 for controlling the storage and the transfer of the photo-electrically converted outputs of the sensor arrays 15 and 16, and a clock circuit 24 for generating a clock pulse $\phi$ of a predetermined period from the start of power feed. The signal processing circuit 21 may be a one-chip microcomputer including a CPU, a RAM and I/O ports. Numeral 25 denotes a lens driver for moving the imaging lens 7 along the optical axis $O_2$ to focus it. It includes a motor which is stopped or forwardly or backwardly rotated in accordance with outputs FM and RM of the signal processing circuit 21 to move the imaging lens 7 into an in-focus position.

The operation of the present invention is now explained for a camera in which a power switch is turned on in a first stroke of a shutter release button and a shutter is released in a second stroke.

When the power switch (not shown) is turned on in the first stroke of the shutter release button (not shown), a power is supplied from a power supply (not shown) to the circuit of FIG. 4 and the clock circuit 24 supplies the clock pulse $\phi$ to the processing circuit 21 and the sensor drive circuit 23. Since the processing circuit 21 supplies a start signal ST to the sensor drive circuit 23, the sensor drive circuit 23 supplies to the sensor 14 a clock signal $\phi c$ produced based on the clock pulse $\phi$ and a signal IC for starting the storage of the photo-electrically converted outputs in the sensor arrays 15 and 16. Thus, the sensor 14 stores outputs representing the light intensity distributions of the images S1 and S2 formed on the planes of the sensor arrays 15 and 16 to produce the data signals a(i) and b(i) (where i=1−N). When the stored output reaches a predetermined level, the sensor 14 provides a signal IE to the drive circuit 23. Thus, the drive circuit 23 produces a signal SH to start the time-serial transfer of the data signals a(i) and b(i) formed in accordance with the stored information from the sensor 14 to the A/D converter 22 in the sequence of a(1), a(2), ... a(N), b(1), b(2), ... b(N), and supplies a signal ED indicating the end of the storage, to the processing circuit 21. The A/D converter 22 converts the input analog signal A of the data signals a(i) and b(i) to an 8-bit digital information D in synchronism with the conversion signal AD from the drive circuit 23 and supplies the digital information D to the processing circuit 21. The processing circuit 21 sequentially stores the digital data signals a(i) and b(i) into the RAM, and after all of the data signals a(i) and b(i) have been stored in the RAM, determines the defocusing quantity of the imaging lens 1 by a signal proccessing method to be described later, and causes the lens driven 25 to focus the imaging lens 1 in accordance with the defocusing quantity. When the focusing operation by the device 25 is completed, the processing circuit 21 again produces the start signal ST to repeat the above operation. Accordingly, while the release button (not shown) of the camera is held in the first stroke, the in-focus state discrimination operation and the focusing operation for bringing the imaging lens 1 to the in-focus state are repeated.

Figure 5:
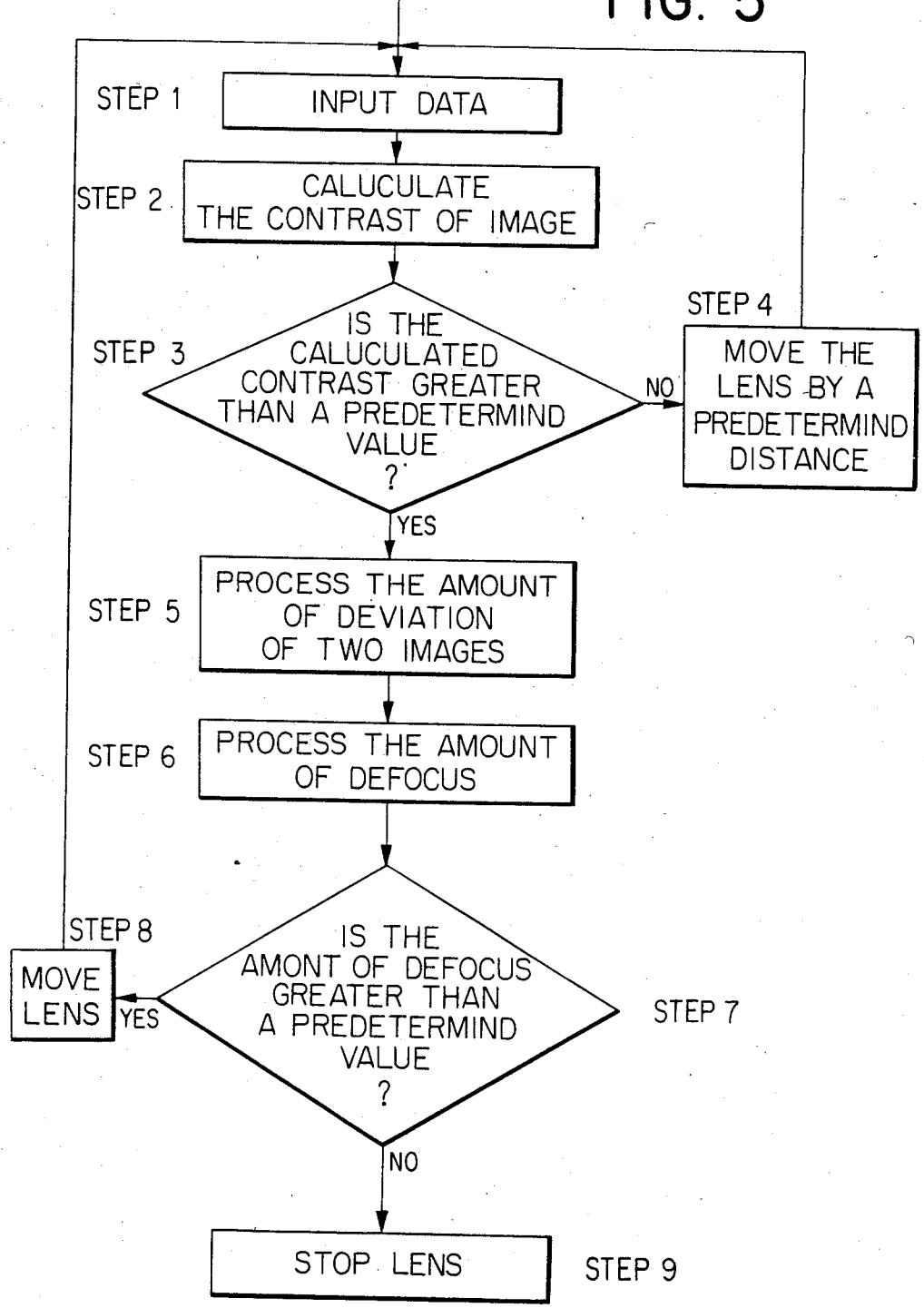
FIG. 5 is a flow chart for showing an operation of the embodiment.

The signal processing method of the signal processing circuit 21 in the present embodiment is now explained with reference to a flow chart of FIG. 5. It is assumed that a software for processing the signals in accordance with the flow chart of FIG. 5 is previouly programmed in the processing circuit 21. A feature of the siganl processing method in the present invention resides in that a contrast of the image is determined prior to the correlation calculation of the two images and the correlation calculation is carried out only when the contrast is sufficiently high.

The processing circuit 21 reads the data signals a(i) and b(i) (i=1−N) into the RAM from the sensor arrays 15 and 16 in a step 1, and carries out a calculation for determining the contrast of the image in a step 2. This calculation is carried out prior to a deviation calculation by the correlation calculation of two images in a step 5 and the following formula may be used.

$$C = \sum_{i=1}^{N-1} |a(i) - a(i + 1)|^2 \quad (2)$$

While the contrast of one of the two images is calculated above, the contrasts of the two images may be calculated.

In the present embodiment, the contrast is defined as a sum of the square of an absolute value of a difference between the outputs of two adjacent ones of the photoelectric conversion elements of the sensor arrays 15 and 16. Since the step of squaring the absolute value is included in the above calculation, the calculation time is one step longer than that of addition only, but it carries out the multiplication as much as (N−1) times which is significantly lower than the number of times, $2N^2$, of the addition in the correlation calculation. For example, when the number of the photo-electric conversion elements of the sensor array is 50, the number of times of the contrast calculation is 49 while the number of times of the correlation calculation is approximately 5,000.

By using the following formula to calculate the contrast, the multiplication can be omitted and the calculation time can be shortened.

$$C = \sum_{i=1}^{N-1} |a(i) - a(i + 1)| \quad (3)$$

If it is determined in the step 3 that the contrast of the image calculated above is sufficiently high, the correlation calculation for determining a deviation of the two images is carried out in the step 5. The correlation calculation may be carried out in accordance with the formula (1) described above or other correlation calculation formula such as $$V(m) = \sum_i |a(i) - b(i + k - m)| - \sum_i |a(i + k) - b(i - m)| \quad (4)$$

$$V(m) = \sum_i \max\{a(i), b(i + k - m)\} - \sum_i \{a(i + k), b(i - m)\} \quad (5)$$

where k in the formulas (4) and (5) is a constant which is normally equal to 1, and max {x, y} in the formula (5) represents a larger one of two real numbers x and y.

If the contrast of the image is determined to be insufficient in the step 3, it is considered that the defocusing quantity of the imaging lens 7 is so large that the images S1 and S2 on the sensor arrays 15 and 16 show low contrast. Accordingly, in a step 4, processing circuit 21 controls the lens driver 25 to drive out or in the imaging lens 7 by a predetermined distance to bring the imaging lens 7 into different focusing state, and the contrast calculation is again carried out in the steps 1 and 2.

Based on the deviation calculated in the step 5, the amount of defocus of the imaging lens 7 is calculated in a step 6, and the amount of defocus is compared with a predetermined value in a step 7, and if it is greater than the predetermined value, the imaging lens is moved in a step 8 into a position closer to the in-focus position and the flow is again started from the step 1. If the amount of defocus is smaller than the predetermined value, the imaging lens is stopped at the current position in a step 9.

In the present embodiment, when the contrast is not higher than the predetermined level in the step 3, the imaging lens 7 is moved by the predetermined amount in the step 4. The step 4 may be replaced by a step of fixing the imaging lens 7 at the current position and issuing an alarm for low contrast.

As described hereinabove, according to the present invention, when the object image has low contrast, it is detected in the early stage of the signal processing and the subsequent correlation calculation which takes the long time is omitted. Accordingly, the response time of the in-focus state detection device is improved and incorrect defocus quantity output is prevented.

What I claim is:

1. A device for detecting an in-focus state of an object lens comprising:
    optical means for forming a plurality of images having relative positional relationship thereof changed in accordance with a focusing state of the object lens;
    said optical means forming the images by light fluxes transmitted through the object lens;
    sensing means for sensing said images;
    discrimination means for discriminating the focusing state of the object lens based on the output of said sensing means; and
    said discrimination means discriminating a contrast of at least one of said images based on the output of said sensing means prior to the discrimination of a correlation of the images and starting the discrimination of the correlation of the images based on the output of said sensing means when the contrast is higher than a predetermined level.

2. A device for detecting an in-focus state of an object lens according to claim 1, wherein said optical means is arranged behind an anticipated focusing plane of the object lens.

3. A device for detecting an in-focus state of an object lens according to claim 1, further comprising focusing means for focusing the object lens in accordance with the output of said discrimination means.

4. A device for detecting an in-focus state of an object lens according to claim 3, wherein said discrimination means moves said object lens by a predetermined amount through said focusing means when the discriminated contrast is lower than the predetermined level.

5. A device for detecting an in-focus state of an object lens according to claim 1, wherein said discrimination means discriminates a defocusing quantity of the object lens based on the correlation of the images.

6. A device for detecting an in-focus state of an object lens comprising:
    optical means for forming a plurality of images having relative positional relationship thereof changed in accordance with a focusing state of the object lens;
    sensing means for sensing the images; and
    discrimination means for discriminating a focusing state of the object lens based on the output of said sensing means;

said discrimination means discriminating a contrast of at least one of the images prior to the discrimination of a correlation of the images, starting the discrimination of the correlation of the image when the discriminated contrast is higher than a predetermined level; and moving said object lens by a predetermined amount through said focusing means when the discrimination contrast is lower than the predetermined level.

7. A device for detecting an in-focus state of an object lens according to claim 6, wherein said discrimination means discriminates a defocusing quantity of the object lens based on the correlation of the images.

8. A device for detecting an in-focus state of an object lens according to claim 6 wherein said optical means forms the images by light fluxes transmitted through the object lens.

9. A device for detecting an in-focus state of an object lens according to claim 6, wherein the discrimination of said at least one of the images is performed by executing a predetermined operation to output signals of elements in said sensing means and thereafter comparing the result of execution with a predetermined value.

10. A device for detecting an in-focus state of an object lens according to claim 9, wherein said predetermined operation is performed by using the following formula:

$$C = \sum_{i=1}^{N-1} |a(i) - a(i+1)|^2$$

wherein N equals to the number of elements in said sensing means for receiving one of said images and a signal outputted from ith element in said sensing means is a(i).

11. A device for detecting an in-focus state of an object lens according to claim 9, wherein said predetermined operation is performed by using the following formula:

$$C = \sum_{i=1}^{N-1} |a(i) - a(i+1)|$$

wherein N equals to the number of elements in said sensing means for receiving one of said images and a signal outputted from ith element in said sensing means is a(i).

12. A device for detecting an in-focus state of an object lens comprising:

optical means for forming a plurality of images having relative positional relationship thereof changed in accordance with a focusing state of the object lens;

said optical means forming the images by light fluxes transmitted through the object lens;

sensing means for sensing said images; and discrimination means for discriminating the focusing state of the object lens based on the output of said sensing means;

said discrimination means discriminating a contrast of at least one of said images based on the output of said sensing means prior to the discrimination of a correlation of the images and starting the discrimination of the correlation of the images based on the output of said sensing means when the contrast is higher than a predetermined level, said contrast being obtained by using the following formula:

$$C = \sum_{i=1}^{N-1} |a(i) - a(i+1)|^2$$

wherein N equals to the number of elements of said sensing means for receiving either of the images and a signal from ith element of said sensing means is a(i).

13. A device for detecting an in-focus state of an object lens according to claim 12, further comprising focusing means for focusing the object lens in accordance with the output of said discrimination means.

14. A device for detecting an in-focus state of an object lens according to claim 12, wherein said discrimination means moves said object lens by a predetermined amount through said focusing means when the discriminated contrast is lower than the predetermined level.

15. A focus detection apparatus comprising:

an objective lens;

optical means provided for dividing an exit pupil of said objective lens to forming a plurality of component images;

sensing means having array-type-photosensors each of which receives each of said component images, for generating signal streams having signals from elements of said sensing means;

operation means for operating a correlation between said component images on the basis of said signal streams to outputting the correlation value;

adjusting means for adjusting the focusing state of said objective lens on the basis of the correlation value;

contrast discriminating means for executing a predetermined operation to signals from elements of a photosensor for receiving at least one of said component images to obtain the contrast value and setting a first and second ranges between which a discriminating value is provided as a demarcation to compare the contrast value with the discriminating value; and control means for operating said adjusting means to move said objective lens by a predetermined amount to execute the focus adjusting operation and thereafter to again control the receipt of signals in said sensing means, when the contrast value is in said first numerical range, and for allowing said adjusting means to operate on the basis of said correlation value.

16. A focus detection apparatus according to claim 15, wherein said control means sets a first and second de-focus ranges between which a de-focus-reference is provided as a demarcation, and operates said adjusting means to move said objective lens by a predetermined amount to perform the focus adjusting operation and thereafter again controls the receipt of signals in said sensing means, when said correlation value is in said first de-focus range, and allows the operation of said adjusting means responsive to said correlation value when said correlation value is in said second de-focus range.

17. A focus detection apparatus according to claim 15, wherein an operation for obtaining said contrast is executed by using the following formula:

$$C = \sum_{i=1}^{N-1} |a(i) - a(i+1)|^2$$

wherein N equals to the number of elements in said sensing means for receiving said component images and a signal outputted from ith element in said sensing means is a(i).

18. A focus detection apparatus according to claim 15, wherein an operation for obtaining said contrast is executed by using the following formula:

$$C = \sum_{i=1}^{N-1} |a(i) - a(i+1)|$$

wherein N equals to the number of elements in said sensing means for receiving said component images and a signal outputted from ith element in said sensing means is a(i).

* * * * *

UNITED STATES PATENT AND TRADEMARK OFFICE
CERTIFICATE OF CORRECTION

PATENT NO. : 4,561,750
DATED : December 31, 1985
INVENTOR(S) : SUSUMU MATSUMURA

It is certified that error appears in the above-identified patent and that said Letters Patent is hereby corrected as shown below:

IN THE DRAWINGS:

Sheet 4 of 4, In Fig. 5, change "CALUCULATE" to --CALCULATE--; change CALUCULATED" to --CALCULATED--; change "AMONT" to --AMOUNT-- and change "PREDETERMIND" to --PREDETERMINED--.

Column 3, line 50, change "date" to --data--.
Column 4, line 53, change "driven" to --driver--;
line 68, change "siganl" to --signal--.
Column 5, line 4, change "constrast" to --contrast--.
Column 7, line 32, after "equals" delete "to";
line 45, after "equals" delete "to".
Column 8, line 5, after "equals" delete "to".
Column 9, line 1, after "equals" delete "to".
Column 10, line 5, after "equals" delete "to".

Signed and Sealed this

Fourth Day of November, 1986

[SEAL]

Attest:

DONALD J. QUIGG

Attesting Officer

Commissioner of Patents and Trademarks